July 14, 1959  H. A. IVY, JR  2,894,543
MITERING ATTACHMENT FOR POWER SAWS
Filed May 16, 1957  2 Sheets-Sheet 1
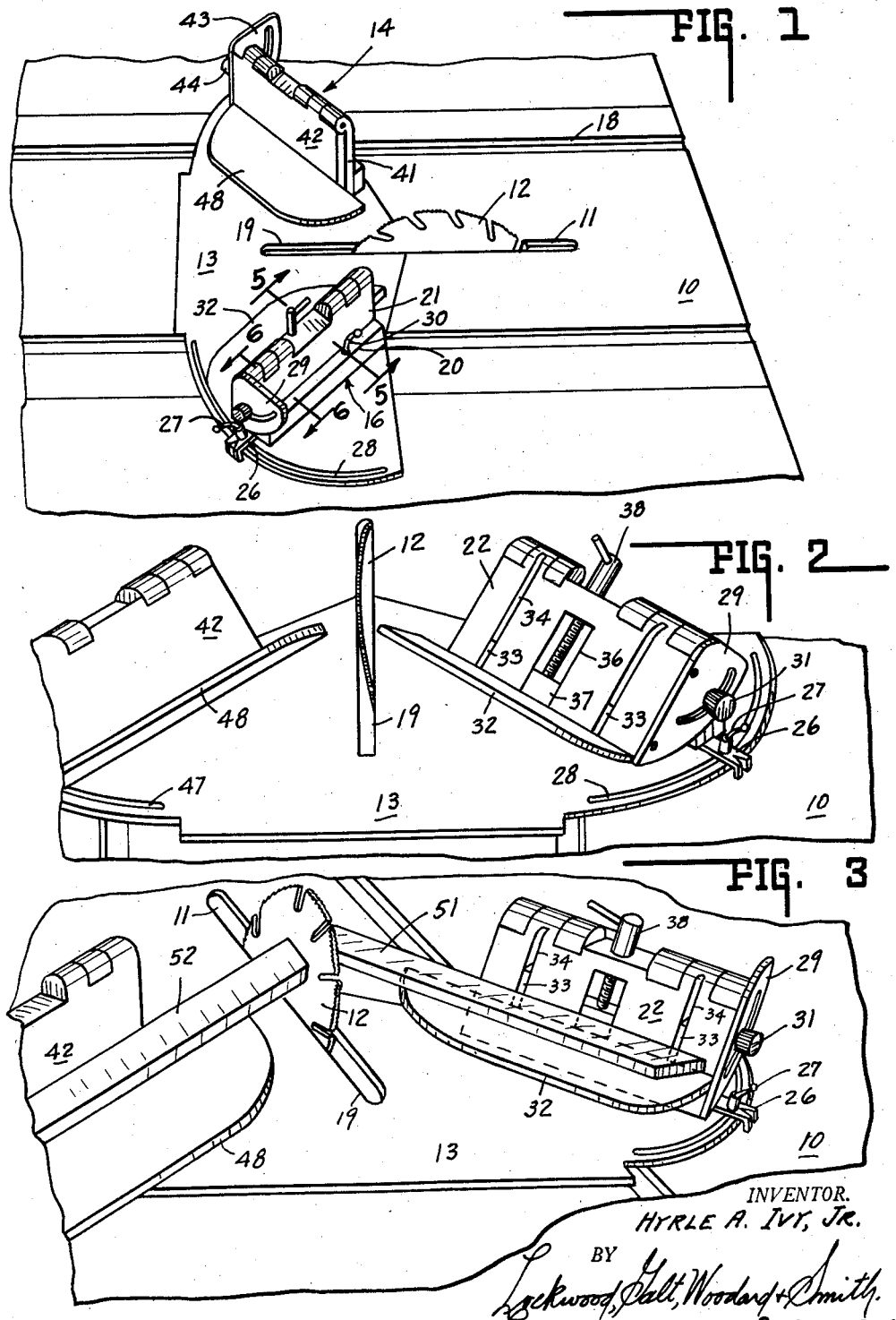
INVENTOR.
HYRLE A. IVY, JR.
BY
Lockwood, Galt, Woodard & Smith
ATTORNEYS.

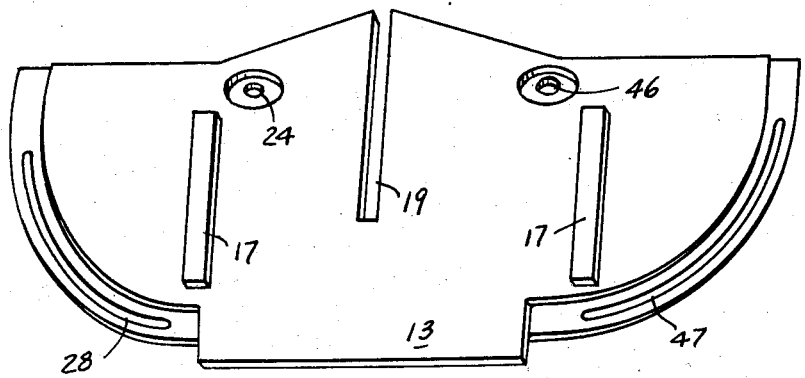
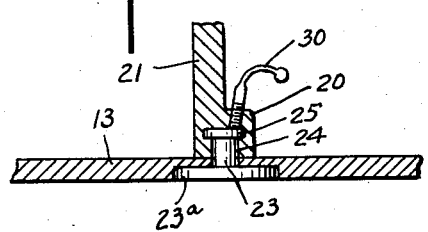
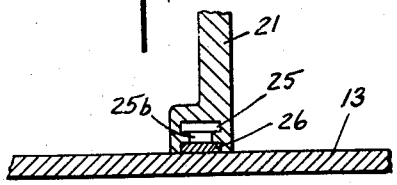
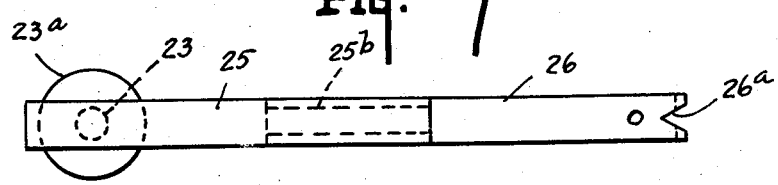

United States Patent Office 2,894,543
Patented July 14, 1959

2,894,543
MITERING ATTACHMENT FOR POWER SAWS

Hyrle A. Ivy, Jr., Fort Wayne, Ind.

Application May 16, 1957, Serial No. 659,609

2 Claims. (Cl. 143—170)

The present invention is related generally to an attachment adapted for use with power saws and particularly to mitering attachments which can be adjusted to provide cutting of all miter angles on a horizontal plane and all miter angles in a vertical plane.

Some conventional power saw assemblies usually provide for sawing miter angles by providing a mitering gage, generally T-shaped, with the cross leg which abuts the board to be cut adjustable in the plane of the saw table. Adjustable tilting of either the saw or the table then provides the adjustable variation of position in the vertical plane necessary to accomplish the sawing of compound angles in a strip of stock. The mechanism in these power saw assemblies necessary to provide for tilting of the saw blade or the table, of necessity, is a considerable factor in the total cost of the saw assembly.

The present invention provides a relatively simple attachment for table saw assemblies which permits table saw assemblies to accomplish compound or miter angle cuts in a particularly accurate fashion.

By providing dual table assemblies, one of which can be adjustably positioned in the vertical plane, the present invention permits two strips of stock to be cut simultaneously with the strips advancing along opposite sides of the saw blade. The saw cuts thereby resulting in the two pieces of stock may then be joined to form a mitered joint of unusual matching accuracy. This simultaneous cutting of two pieces of stock may be accomplished for any angle in the horizontal plane and for relatively steep compound angles, the height of such angles being limited by the height and size of the saw blade in the power saw assembly. Thus, when cutting two pieces of stock, either two or four angles may be cut in one operation.

These and other objects of the present invention will become apparent as the description proceeds with reference to the accompanying drawings in which:

Figure 1 is a perspective view of an apparatus embodying the present invention in place on a conventional power saw assembly.

Figure 2 is a further perspective view of the apparatus of Figure 1 showing the component parts in differing relative positions.

Figure 3 is a further perspective view of the apparatus of Figure 1 illustrating simultaneous saw cuts being made in two pieces of stock.

Figure 4 is a perspective view of the underside of the base of the apparatus of Figure 1.

Figure 5 is a fragmentary, cross-sectional view of a portion of the apparatus taken generally along the lines 5—5 of Figure 1.

Figure 6 is a fragmentary, cross-sectional view similar to Figure 5 but taken generally along the line 6—6 of Figure 1.

Figure 7 is a top view of a portion of the apparatus shown in Figures 5 and 6.

Figure 8 is a side view of the apparatus shown in Figure 7.

Referring initially to Figure 1, there is shown at 10, a conventional power saw table or platform, having a central slot 11 therein, accommodating a rotating saw blade 12. The blade 12 is adapted to be rotated by a suitable power means (not shown), conventionally mounted beneath the saw table 10. The attachment embodying the present invention includes a base 13 having mounted thereon dual work-carrying means indicated generally at 14 and 16. As may be seen in Figure 4, the underface of the base 13 carries suitable metal strips 17 which are adapted to fit within the longitudinal grooves 18 in the saw table. It will be understood that these strips may be so positioned on the base 13 as to be accommodated in tables having variously spaced grooves. Base 13 has a central slot 19 therein which accommodates the saw blade 12 when the base 13 is moved over the face of the saw table, this movement being guided by the co-operation of the strips 17 and the grooves 18.

The work carrying means 16 comprises an upright member 21 hingedly attached at its upper margin to a member 22 (Figure 2) similar in form to the member 21. The member 21 carries a lateral support member 20 along its lower margin and, as may be seen in Figures 5, 7 and 8, the member 21 is pivotally attached to the base 13 by means of a pin 23 having an enlarged head 23a. The pin 23 extends through an opening 24 in the base 13 and is rigidly attached to the underface of a bar 25 (Figs. 7 and 8). A bar 26 is joined in offset fashion, by means of a strip 25b, to the bar 25. As may best be seen in Figure 6, the strip 25b is reduced in width with relation to bars 25 and 26, and the underface of the member 21 is grooved so as to accommodate bars 25 and 26 and the strip 25b. This groove, accommodating the bars and strip, extends along the underface of member 21 for one-half its length, the remaining half of the length of member 21 has a similar groove but is T-shaped, as indicated in Figure 5, accommodating the pin 23 and the bar 25. A suitable clamping member 30 is threaded into the member 20 and abuts the bar 25 to clamp the member 21 in fixed relation to the bar 25. When the clamping member 30 is loosened, it will be evident that the member 21 may be caused to slide along the bar 25 and its position fixed on the bar 25 by tightening the member 30. It will be understood that the member 25 may thus be adjustably positioned closer to or further from the saw blade and that the member 21 may be angularly positioned with relation to the saw blade by pivotal movement of bars 25 and 26 about the pin 23. The extending end of bar 26 is bent downwardly, and, as may be seen in Figure 1, carries a clamping member 27 which cooperates with a suitably headed bolt (not shown) adapted to extend through an arcuate slot 28 formed along the curved margin of the base 13. Loosening the clamping member permits the bars 25 and 26 to be angularly positioned about the pin 23 and subsequent tightening of member 27 serves to fix the angular position of bars 25 and 26 and, consequently of member 21. The tip of bar 26 may carry a V-shaped slot 26a (Figure 7) therein which is adapted to cooperate with suitable angle marking indicia (not shown) which may be suitably carried by the base 13 adjacent its curved marginal edge. Adjustment of the relative angular position of members 21 and 22 may be accomplished by means of the co-action of a slotted adjusting plate 29 carried by the member 22 at its side-margin and a manually operable clamping screw 31 which extends freely through the arcuate slot in the plate 29 and is threaded into an appropriate hole in the member 21. As may be seen in Figure 2, the angular relation between the members 21 and 22 may be readily adjusted by means of the plate 29 and the clamping screw, the limits of such adjustment being fixed by the length of the arcuate slot in the plate 29.

A shelf or platform 32 is carried by the member 22, the platform 32 being joined to the members 23 which are movably accommodated within the T-shaped keyways 34 in the member 22. A central enlarged slot 36 in the member 22 accommodates a block 37 carried by the platform and receiving an adjusting screw 38. The elongated adjusting screw 38, adapted for manual rotation, extends freely through an opening in the upper edge-face of the member 22 and is threaded into an appropriate opening in the block 37. It will be understood that rotation of the screw 38 serves to adjustably position the platform 32 with relation to the member 22.

The work carrying means 14 is formed similarly to the means 16, just described, and comprises hingedly joined members 41 and 42. The angular relative positions of the members 41 and 42 may be adjusted by means of the clamping screw 44 cooperating with a plate 43 which is identical to the clamping screw 31 and the plate 29 previously described. The member 41 is pivotally mounted upon the base 13 by means of a suitable pivot pin corresponding to the pin 23 extending through an opening 46 (Fig. 4) and is adjustably positioned on bars which are counterparts of bars 25 and 26 previously described. An arcuate slot 47 (Figure 2) in the adjacent curved margin of the base 13 accommodates a headed bolt cooperating with a clamping member (not shown) in every way identical to the clamping member 27 previously described. The member 42 carries a shelf or platform 48 which is fixedly mounted adjacent the lower margin of the member 42 and is not adjustably movable thereon as is the platform 32 described with reference to the work carrying means 16, In operation, with the parts of the assembly in their adjusted positions of Figure 1, the platforms 48 and 32 will be generally in the same horizontal plane and parallel to the plane of the table 10. As shown in Figure 1, the members 41 and 42 and the members 21 and 22 are positioned at approximately a 45° angle with the saw blade 12. Under these conditions if a piece of stock to be sawed is placed and held upon either the platform 32 or the platform 48 in the fashion illustrated in Figure 3, manual advancement of the base 13 towards the saw blade 12 will result in a horizontal saw-cut in the stock at an angle which corresponds to the angularly adjusted position of the corresponding work-carrying means.

With the components of the assembly in their positions of Figure 2, it will be noted that an angular relation is established between the members 21 and 22 and also between the members 41 and 42, thereby correspondingly tilting the platforms 32 and 48 in relation to the plane of the saw table 10. Under these conditions, if a piece of stock to be sawed is placed upon either the platform 32 or the platform 48, advancing the base toward the saw blade 12, will accomplish a miter angle saw-cut in the stock.

Referring now to Figure 3, it will be noted that the components of the attachments are in the same relative position as indicated in Figure 1 except that the platform 32 has been adjustably raised along the face of the member 22 so that the platforms 32 and 48 are vertically spaced from each other. Strips of stock, referred to at 51 and 52 in Figure 3, may be positioned and held on the platforms 32 and 48 respectively, with the strip 51 overlying the strip 52. If the strips 51 and 52 are manually or otherwise held within the angle formed by its corresponding platform and member, and the entire attachment assembly is moved toward the saw blade 12, miter angle saw-cuts will simultaneously be made in the strips 51 and 52. It will be evident that with the members 41 and 42 and the members 21 and 22 adjusted into relative positions such as that shown in Figure 2, and with platform 32 raised above the level of platform 48, compound angle matching saw-cuts may be simultaneously made in two pieces of stock carried upon the platforms. With the platforms 32 and 48 untilted as shown in Figures 1 and 3, simple miter angles may be simultaneously cut in strips of stock with the height of the compound angle being limited by the magnitude of the extension of the saw blade above the table 10. The provision of the adjustability in position of member 21 along the bars 25 and 26 and similarly the adjustability of member 42 along the counterpart bars permit positioning the work carrying means 14 and 16 closer to or further from the saw blade, the closer position being used when cutting stock of relatively small cross-section and having, consequently, reduced rigidity.

From the foregoing it will be understood that the present invention provides an attachment for power saws which permits the accomplishing of horizontal and compound angle saw-cuts, and which, by means of the provision for elevating one of the work-accommodating platforms permits saw-cuts to be simultaneously made in two pieces of stock which may then be joined to form a mitered joint of unusual matching accuracy.

While the invention has been disclosed and described in the drawings and in the foregoing description, they are to be considered as illustrative and not restrictive in character as other modifications may be possible within the broad scope of the invention, which is to be limited only by the appended claims.

1. For a power saw of the type having a circular saw blade and a table intersected by the plane of said saw blade, an attachment comprising a base plate slidable in guided relation over the table and spanning said saw blade, dual work-carrying means mounted on the base plate, said work-carrying means comprising dual elongated members pivotally mounted about vertical axes on said base plate on opposite sides of said saw blade and adjustably movable about their pivotal mountings to determine their angular relation with said saw blade, a vertically extending plate mounted on each of said elongated members and adjustably shiftable along said elongated members, a depending plate hingedly joined along its upper margin to the upper margins of each of said vertically extending plates, means for adjustably fixing the angle between each of said vertically extending plates and its corresponding depending plate, a work carrying platform supported on each of said depending plates adjacent their lower margins, and means for adjustably raising or lowering one of said platforms along the face of its corresponding depending plate, whereby adjustment of the angular relation of said elongated members to said saw blade and adjustment of the angle between said extending and depending plates determines the compound angle of cut in work-pieces carried by said platforms, the raising of said one of said platforms on its corresponding depending plate permitting simultaneous sawing of work pieces carried on each of said platforms.

2. For a power saw of the type having a circular saw blade and a table intersected by the plane of said saw blade, an attachment comprising a base plate slidable in guided relation over the table and spanning said saw blade, dual work-carrying means mounted on the base plate, said work-carrying means comprising dual elongated members pivotally mounted about vertical axes on said base plate on opposite sides of said saw blade and adjustably movable about their pivotal mountings to determine their angular relation with said saw blade, a vertically extending plate mounted on each of said elongated members and adjustably shiftable along said elongated members, a depending plate hingedly joined along its upper margin to the upper margin of each of said vertically extending plates, means for adjustably fixing the angle between each of said vertically extending plates and its corresponding depending plate, a work carrying platform supported on each of said depending plates adjacent their lower margins, whereby adjustment of the angular relation of said elongated members to said saw blade and adjustment of the angle between said extending and depending plates determining the compound angle of cut in work pieces carried by said platforms, the shiftability of said vertically extending plates on said elongated members permitting the attachment to accommodate work-pieces of varying cross-sectional area and rigidity.

References Cited in the file of this patent

UNITED STATES PATENTS

| | | |
|---|---|---|
| 556,658 | Barnes | Mar. 17, 1896 |
| 786,539 | Wales | Apr. 4, 1905 |
| 812,574 | Linton | Feb. 13, 1906 |
| 1,831,124 | Koster | Nov. 10, 1931 |

FOREIGN PATENTS

| | | |
|---|---|---|
| 158,115 | Great Britain | Feb. 3, 1921 |
| 936,091 | France | Feb. 16, 1948 |